(12) United States Patent
Stiesdal et al.

(10) Patent No.: US 7,473,385 B2
(45) Date of Patent: Jan. 6, 2009

(54) METHOD FOR MANUFACTURING WINDMILL BLADES

(75) Inventors: Henrik Stiesdal, Odense C (DK); Peder Bay Enevoldsen, Vejle (DK); Kaj Johansen, Aabybro (DK); Jens Jørgen Ø Kristensen, Nibe (DK); Michael Nørlem, Svenstrup (DK); Martin Winther-Jensen, Haslev (DK)

(73) Assignee: Bonus Energy A/S, Brande (DK)

( * ) Notice: Subject to any disclaimer, the term of this patent is extended or adjusted under 35 U.S.C. 154(b) by 837 days.

(21) Appl. No.: 10/292,904

(22) Filed: Nov. 13, 2002

(65) Prior Publication Data

US 2003/0116262 A1 Jun. 26, 2003

(30) Foreign Application Priority Data

Nov. 13, 2001 (DK) ............................... 2001 01686
Nov. 22, 2001 (DK) ............................... 2001 01745

(51) Int. Cl.
*B29C 70/36* (2006.01)
*B29C 70/48* (2006.01)
*B29C 33/00* (2006.01)

(52) U.S. Cl. ................... 264/314; 264/313; 264/258; 264/571; 416/230

(58) Field of Classification Search ......... 264/510–512, 264/257–258, 324, 102, 313, 314, 317, 571; 416/132 B, 230

See application file for complete search history.

(56) References Cited

U.S. PATENT DOCUMENTS 2,155,375 A * 4/1939 Jablonsky .................. 264/510
2,913,036 A * 11/1959 Smith ......................... 264/102
3,382,125 A * 5/1968 Lowdermilk, Jr. ........... 156/214
4,120,632 A * 10/1978 Stoeberl ................... 425/405.1
4,165,358 A * 8/1979 Johnson ..................... 264/571
4,565,595 A * 1/1986 Whitener .................... 156/156
4,639,284 A * 1/1987 Mouille et al. .............. 156/213
4,828,781 A * 5/1989 Duplessis et al. ........... 264/250

(Continued)

FOREIGN PATENT DOCUMENTS

| DE | 2443726 | 3/1976 |
| EP | 0722825 | 7/1996 |
| FR | 2555501 | 5/1985 |
| JP | 07-279818 | * 10/1995 |
| NL | 8104019 | 3/1983 |
| NL | 8800301 | * 2/1988 |
| NL | 8800301 | 9/1989 |

OTHER PUBLICATIONS

Derwent Abstract 1989-276181, "Production of Hollow Fiber reinforced Plastic Bodies", Azno NV, 1989.*

*Primary Examiner*—Christina Johnson
*Assistant Examiner*—Matthew J. Daniels
(74) *Attorney, Agent, or Firm*—James Creighton Wray; Clifford D. Hyra

(57) ABSTRACT

A method for making a windmill blade is provided, whereby problems with glue joints and with exposure of the workers to environmentally hazardous substances are avoided. This is effected by making the windmill blade in a closed mold with a mold core (3) inside mold parts (22, 48) for formation of a mold cavity (51), in which fiber material (45, 47) and core material (46) are placed. After applying vacuum to the mold cavity (51), matrix material (57) is injected via a filling pipe (29), which is placed at a downwardly oriented side edge of the blade during the filling. Hereby is established a flow front (61) which is used for indicating complete filling when this reaches the trailing edge of the blade and penetrates out through overflow apertures.

18 Claims, 6 Drawing Sheets

U.S. PATENT DOCUMENTS

Figure 1:
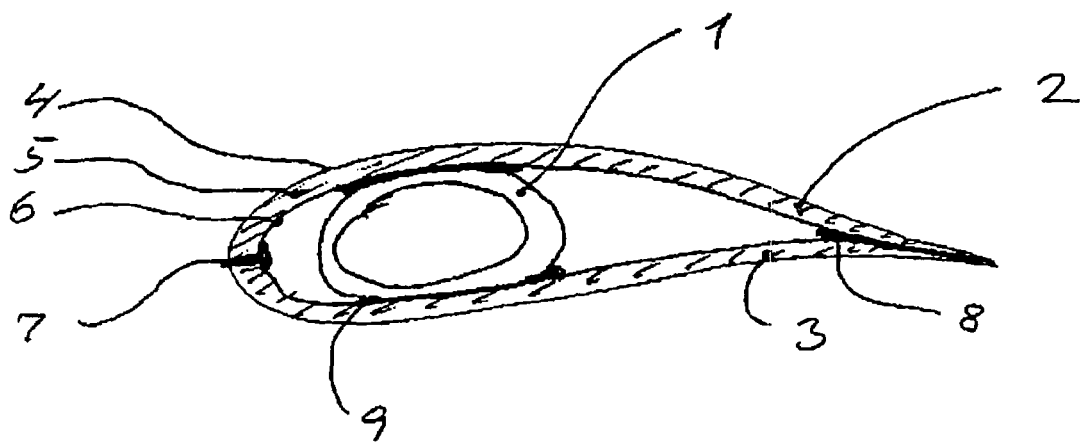

| | | | | |
|---|---|---|---|---|
| 4,942,013 A | * | 7/1990 | Palmer et al. | 264/511 |
| 5,132,069 A | * | 7/1992 | Newton | 264/257 |
| 5,236,321 A | * | 8/1993 | Newton | 425/123 |
| 5,259,901 A | * | 11/1993 | Davis et al. | 156/154 |
| 5,304,339 A | * | 4/1994 | Le Comte | 264/511 |
| 5,427,726 A | * | 6/1995 | White et al. | 264/137 |
| 5,653,907 A | * | 8/1997 | Kendall et al. | 249/79 |
| 5,885,513 A | * | 3/1999 | Louderback et al. | 264/459 |
| 6,071,460 A | * | 6/2000 | Renaudin et al. | 264/314 |
| 6,149,844 A | * | 11/2000 | Graham | 264/71 |
| 6,264,877 B1 | * | 7/2001 | Pallu de la Barriere | 264/516 |
| 6,565,792 B2 | * | 5/2003 | Hemphill | 264/510 |
| 6,638,466 B1 | * | 10/2003 | Abbott | 264/238 |
| 6,773,655 B1 | * | 8/2004 | Tunis, III et al. | 264/510 |

* cited by examiner

PRIOR ART

PRIOR ART

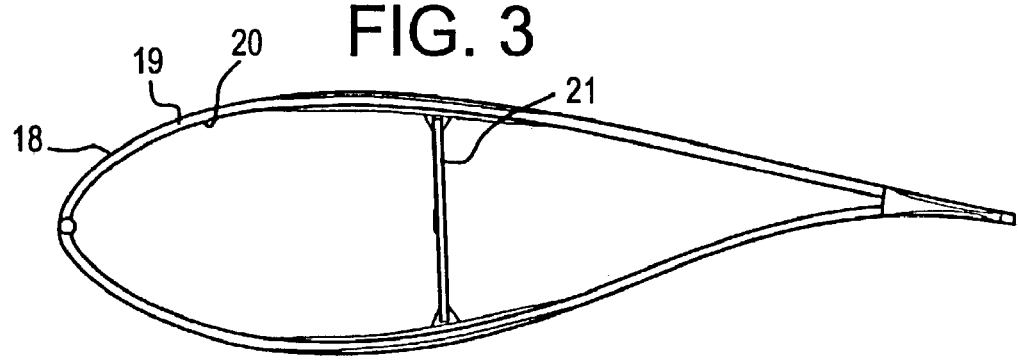
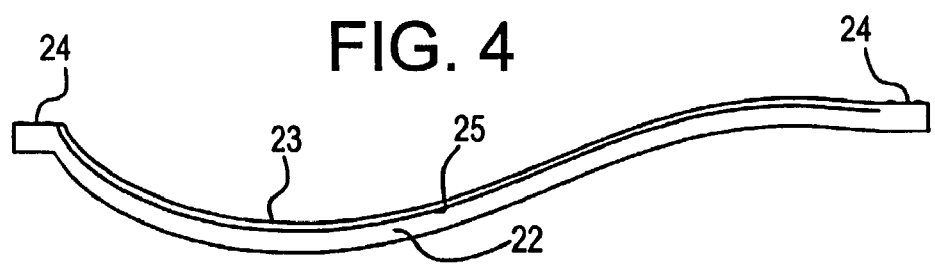
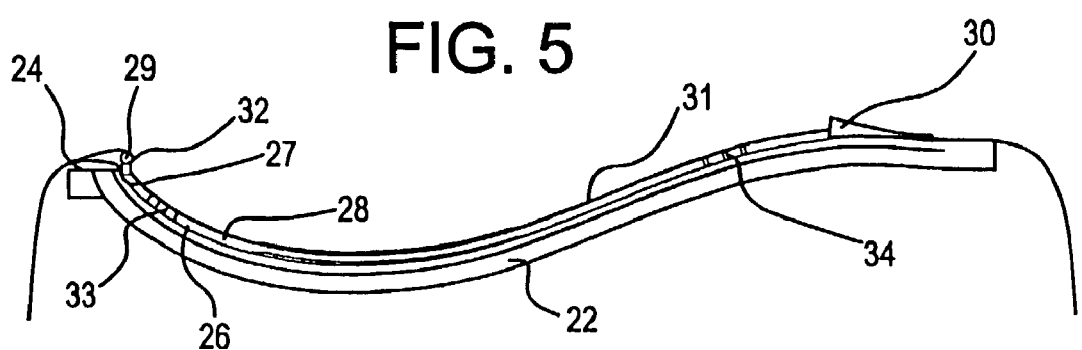

METHOD FOR MANUFACTURING WINDMILL BLADES

FIELD OF THE INVENTION

The present invention concerns a method for making windmill blades of composite materials such as glass or carbon fiber reinforced epoxy, polyester, vinyl ester, or thermoplastic.

BACKGROUND ART

Different methods for making windmill blades are known.

Thus it is known that windmill blades may be made by winding roving tapes or roving bundles around a core or mandrel. Methods for this are inter alia described in U.S. Pat. Nos. 4,242,160 and 4,381,960.

Such methods by winding have the disadvantage that after setting, the winded item will normally appear with the raw composite material surface as an external surface which is incompatible with many applications, e.g. for windmill blades. A satisfactory surface quality therefore presupposes a finishing treatment, e.g. by the bonding of shells made separately.

Another drawback by this method is that the winding normally presupposes use of a mandrel with a certain strength which therefore is desired to be reused. In these cases, the method may only be used with items having a geometry allowing removal of the mandrel, which means that the dimensions of the internal cross-section of the cavity at a given distance from the end from which the mandrel it drawn out are not to exceed the dimensions of any of the cross-sections situated between the position in question and the end, and that some tapering in the mold will normally be required in practice. Such a method may thus not be used for e.g. tanks or whole windmill blades.

It is also prior art that windmill blades may be made by a method where a blade is usually made with two half-shells which are joined at leading and trailing edges by bonding. The half-shells are usually supported inside the blade cavity by one or more beams, which are also joined to the half-shells by bonding, where the beams e.g. may be made in U- or I-shape so that the flanges of these beams form contact surfaces with the half-shells, or where the beams e.g. may be made by winding so that a part of the external surface of the winded beam forms contact surfaces towards the half-shells. The half-shells may e.g. be made of dry fiber materials which are supplied resin by manual laying, vacuum injection or the like, or they may be made of prepeg, where the fiber materials are impregnated in advance with resin which is brought to set by the action of heat, UV-irradiation, or similar. In other embodiments, beams and/or half-shells are made of thermoplastic, e.g. by using fiber materials that are combinations of temperature resisting fiber materials and thermoplastic, and where the fiber material after laying is brought to a temperature where the thermoplastic material melts, thereby acting as resin in the finished laminate.

However, it is a problem with this method that it may be difficult to ensure a satisfying quality of the glue joints established in the interior of the structure for the mutual joining of the half-shells and for joining possible beams with the half-shells. This is partly due to fundamental problems regarding material technology, partly to more specific manufacturing problems.

The fundamental problems regarding material technology may summarizingly be described as consequences of the impossibility of having the same material properties in the glue as in the rest of the blade. The reason for this is that the general material properties in the blade shells and the laminates of the possible beams are determined by the fiber reinforcement, which normally has rigidity several orders of magnitude higher than that of the resin, whereby the properties of the resin has minimal significance for the rigidity of the finished laminate. Conversely, the glue is normally made as pure resins (which may consist of other plastics than those used in the laminates) or as mixtures of resins and fillers but without fiber reinforcement. The result is that the elastic modulus of the glue typically deviates an order of magnitude, often several orders of magnitude, from the parts joined with the glue. To this comes that glue materials are often brittle and may therefore be vulnerable to local moments tending to open the glue joint, so-called peeling. Such local moments will particularly occur by very large loads on the blade, where non-linear effects may imply the blade cross-section changing its shape. By virtue of glue materials normally having relatively brittle properties, there may be the subsequent danger that cracks in glue joints propagate far beyond the area in which the original overloads have occurred.

Among the manufacturing problems, one of the essential is that the glue joints are provided at leading and trailing edge and between beam and shell, so that a glue joint is established on the unprepared surface at the inner side of the shell laminate. The problem of this joint is that the glue surface may only be defined within a certain large range of tolerance. To this comes that in the case of the trailing and leading edge bond the shell laminate has to be reduced towards the edge of the shell when, as e.g. in the case of windmill blades, the case is half-shells where the edges are abutting mutually inclining in order that the glue joint can have nearly uniform thickness. This reduction may not always be provided with the necessary tolerances why a real adaptation will require working of the assembly faces, which in turn will imply a large rise in the costs. Another problem is that the deformations arising in the blade shells in connection with small variations in the manufacturing process can give a varying gap inside the cavity of the item so that it may be difficult to ensure a complete filling of glue of the interspace between beam and shell. All these problems with tolerances have the result that glue joints generally may have varying cross-sections and fillings which in turn implies a risk of considerable stress concentrations in the glue and the adjoining blade shells and beams. Furthermore, it is a problem that most glue materials presupposes that the surfaces to be bonded are ground in advance with the associated problems of maintaining the necessary tolerances. Finally, the glue joints are usually difficult to inspect visually as well as they are difficult to inspect by NDT methods (non-destructive testing) due to the tapering laminate and the irregular geometry of the item.

It is also a problem with methods based on bonding individual parts of blades that even though individual sections of the blades may be produced in closed processes with small or no environmental loads, this is usually not the case with the bonding itself. Here, workers will usually be exposed to grind dust from dry grinding, partly because it is unfavorable to the subsequent gluing process to perform wet grinding and partly because they are exposed to contact with and/or vapors from the glue material itself, implying need for personal protective means.

SUMMARY OF THE INVENTION

The purpose of the invention is to provide a method for making windmill blades of composite materials so that these may be manufactured in a closed process and mainly in one piece without any glue joints.

This is achieved with a method of the kind indicated in the introduction, which is peculiar in that the blade is made in one piece in a closed mold and, depending on the type of composite material, possibly also all of or parts of the matrix material, are placed around at least one mold core consisting of an external part of flexible material, that an outer mold part is closed around mold core and possible matrix material, that fiber reinforcement and matrix material are brought into the union relevant for the selected composite material, and that at least a part of the internal part of the mold core is then taken out of the finished windmill blade.

Several advantages are attained by this method compared with prior art methods.

By making the blade in one piece, where a substantial part of the outer side is an impression of one or more outer mold parts there is achieved the advantage that by using gelcoat in the mold or by a subsequent simple surface, the blade surface may appear in the quality required with regard to aerodynamic efficiency and aesthetic impression.

By making the blade in one piece without any glue joints, the prior art problems with glue joints, including problems with tolerances of glue joint dimensions and the difficulties with subsequent inspection of the quality of the glue joints, are eliminated.

By making the blade in one piece in a closed process, the workers' exposure to possible environmentally hazardous substances in the composite material is eliminated, so that the need for personal protective means may be reduced to an absolute minimum.

By making the blade in a sandwich construction with a core material which largely runs continuously around the cross-sectional profile of the blade, there is achieved a particularly advantageous combination of production technique and properties of the finished product. The core material may thus be used as evacuation and flow duct by a vacuum based process, and the continuous process ensures uniform cross-sectional properties without disadvantageous transitions between sandwich and solid structure in highly loaded areas. The continuous core material and the real separation of the load bearing part of the laminate in an outer and an inner section furthermore provides the constructional advantage that a possible crack formation in one (outer or inner) laminate only implies a very small risk of propagation to the other laminate. Hereby is achieved a hitherto unknown redundancy of the structure.

THE DRAWING

Figure 2:
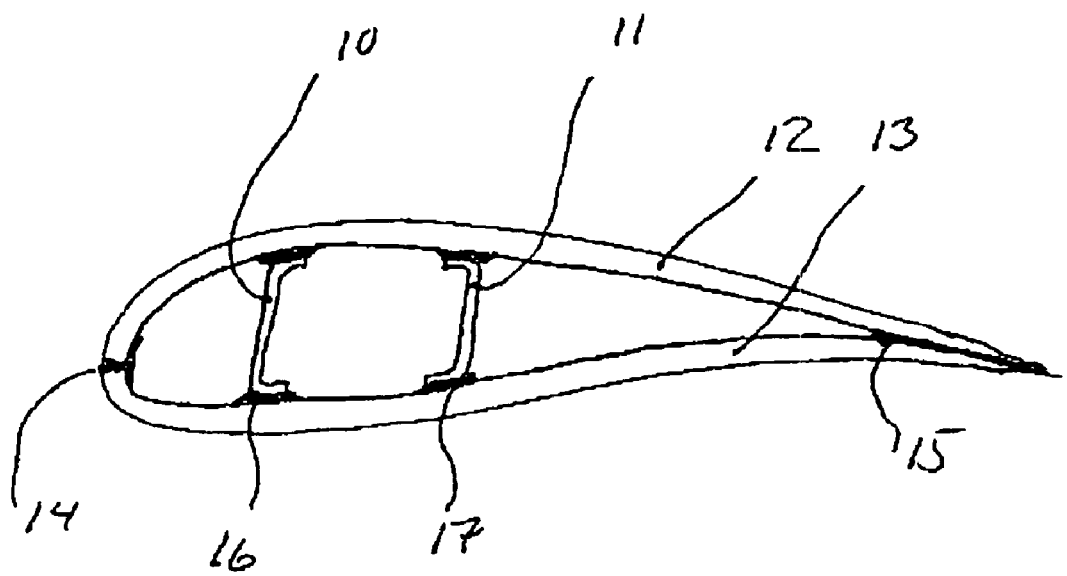

In the following, the method will be explained in detail as reference is made to the Figures. FIGS. 1-2 provides examples of prior art, and FIG. 3 indicates a blade made in accordance with the invention. With the FIGS. 4-11, the method is explained in an embodiment where the laminate is made of thermosetting plastic by vacuum injection.

DESCRIPTION OF EMBODIMENTS

FIG. 1 shows a windmill blade made according to a usual method. A beam 1 is made by winding around a mandrel which later is taken out of the beam. Around the beam is glued two half-shells 2 and 3. Each half-shell consists of an outer laminate 4, a sandwich core 5, which e.g. can be made in balsa wood or PVC foam, and an inner laminate 6. The half-shells are fastened by glue joints at the leading edge 7, at the trailing edge 8, and against the beam 9. A blade made according to this usual method initially has three main parts, namely the beam 1 and the two half-shells 2 and 3. According to the circumstances, these main parts may be supplemented with further main parts, e.g. at the root of the blade, for forming transition to pitch bearing and/or rotor hub.

FIG. 2 shows a windmill blade made according to another usual method. Two beams 10 and 11 are made by molding in separate molds. The two beams are joined with two half-shells 12 and 13. The half-shells are fastened by glue joints at the leading edge 14, at the trailing edge 15, and against the beams 16 and 17. At the outset, a blade made according to this prior art method has four main parts, namely the beams 10 and 11 and the two half-shells 12 and 13. Depending on the circumstances, these main parts may be supplemented with further main parts, e.g. at the root of the blade, for forming transition to pitch bearing and/or rotor hub.

FIG. 3 shows a windmill blade made by the method according to the invention. The blade is an integrated unit, which is constituted by an outer shell 18, a sandwich core 19, an inner shell 20 and a shear web 21. In other sections, the blade may be made with plural shear webs or completely without webs.

FIG. 4 shows a cross-section of a mold part suited for making windmill blades with the method according to the invention, where the laminate is made by vacuum injection of thermosetting plastic. The mold part 22 is made as a negative impression of a part of the external surface of the blade; as an example here is shown the section termed the pressure side, which during operation of the windmill largely faces the wind. The mold part 22 may be treated with a suited release agent on the surface 23 on which the blade in molded. The mold part is provided with closure edges 24 with which tightness through abutment against other mold parts may be achieved. The mold part may be achieved with an integrated temperature regulating system 25 with which the temperature of the blade laminate may be changed during setting. The mold part 22 may be composed of several parts with joints that are to achieve tightness.

FIG. 5 shows a first step in making windmill blades by the method according to the invention. An outer layer of fiber material 26 is laid in the mold part 22, e.g. mats or web of glass fiber or carbon fiber. Some of the outer layer of fiber material may e.g. extend out beyond the closure edge 24 at the leading edge 27. Upon at least a part of the outer layer of fiber material 26 there is provided a core material 28 that e.g. may be made in balsawood or PVC foam. At one or more suited places, here indicated by the leading edge 27, is provided one or more flow pipes 29, or other kinds of apertures are made along the blade. Besides the core material 28, which is placed upon the outer layer of fiber material 26, other core parts 30 may be provided, entirely or partly enclosed by the fiber material 26. At least a part of the surface of the fiber material 26, the core material 28, the possible flow pipe 29 and possible other core parts 30, are then covered by an inner layer of fiber material 31. This inner layer of fiber material 31 may in the same way as the outer layer of fiber material 26 entirely or partly extend beyond the closure edge 24. The flow pipe 29 may be provided with holes or saw grooves 32, or in other ways there may be provided flow ducts for resin from the interior of the flow pipe 29 to the core material 28, to the outer layer of fiber material 26 and to the inner layer of fiber material 31. The core material 28 and possible other core parts 30 may be provided with tracing 33, or flow paths for resin between the core material 28 and at least one of the two layers 26 and 31 may be provided. The core material 28 and possible other core parts 30 may be provided with borings or through-going cuttings 34, or flow ducts for resin between the two surfaces of core material 28 may be provided in other ways.

Figure 6:
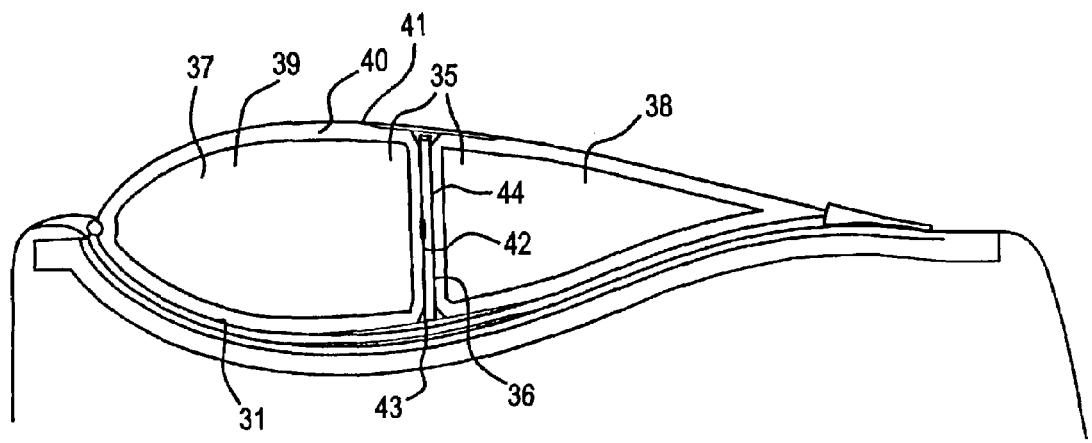

FIG. 6 shows a subsequent step in the making of windmill blades with the method according to the invention. On the inner layer of fiber material 31, the mold core 35 and possible shear webs 36 are placed. In the shown example, a mold core in two parts 37 and 38 is utilized that each may be divided into subparts. A core part 37 may e.g. consist of a firm inner part 39 that e.g. may be made of wood or composite material. The firm inner part 39 may be surrounded on at least a part of its outer side of a flexible outer part 40, which e.g. may be made in foam rubber. Each core part 37 is surrounded by a flexible, airtight membrane 41 that e.g. may be made of nylon or silicone rubber. The flexible membrane 41 may be treated with a suitable release agent. A shear web 36 may be made with an inner core part 42, which e.g. may be made of plywood, balsawood or PVC foam, and which at each side may have a core support part 43 in one or more parts, which e.g. may be made of plywood, balsawood or PVC foam. On each or both sides of the core parts 42 and 43, a fiber material 44 of e.g. glass or carbon can be placed. The fiber material 44 may advantageously extend to some extent across the inner layer of fiber material 31, as well as it may extend across the core part 37.

Figure 7:
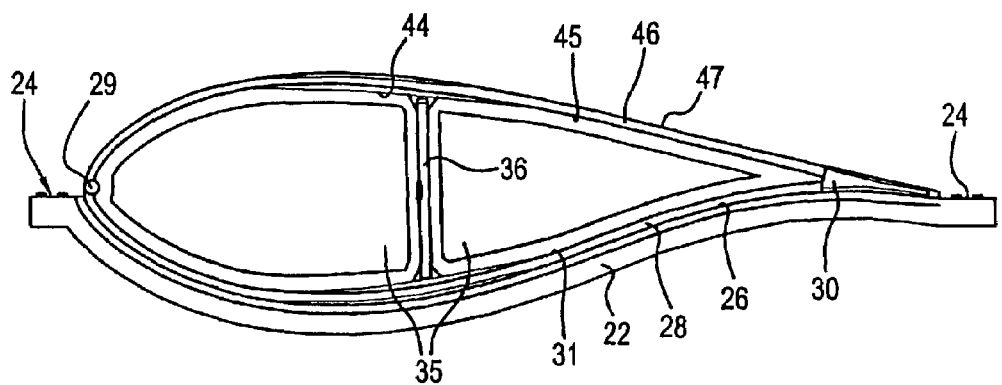

FIG. 7 shows a subsequent step in making windmill blades with the method according to the invention. Across the core part 35 and the fiber material 44 from the possible shear web or webs 36, an inner layer of fiber material 45 is laid that e.g. may be mats or web of glass or carbon fibers, which advantageously may be composed in the same way as the inner layer of fiber material 31 in the lower mold part 22. On top of at least a part of the inner layer of fiber material 45 there is provided a core material 46, that e.g. may be made in balsawood or PVC foam, and which advantageously may be shaped in the same way as the core material 28 in the lower mold part 22. In some cases, it will be advantageous to postpone the laying of the flow pipe 29 as described above in step 5 to this stage of the process. At least a part of the surface of the fiber material 45, the core material 46, the possible flow pipe 29 and possible other core parts 30 are then covered by an outer layer of fiber material 47. This outer layer of fiber material 47 may e.g. be mats or web of glass or carbon fiber, and may advantageously be composed in the same way as the outer layer of fiber material 26 in the lower mold part 22. In the process of laying the inner fiber material 45, core material 46 and outer fiber material 47, the parts of the outer layer of fiber material 26 and the inner layer of fiber material 31, which extend beyond the closure edge 24 after laying of the material in the mold part 22, are put together into the inner fiber material 45 and/or the outer fiber material 47, so that overlap of fiber material across the joint face 48 occurring at the closure edge 24 is achieved. These layers of fiber materials 26 and 31 that extend beyond the closure edge 24 after laying of the material in the mold part 22 may entirely or partly extend right to the trailing edge when they are laid upon the mold core 35, the fiber material 44 from the possible shear web or webs, and/or the core material 46.

Figure 8:
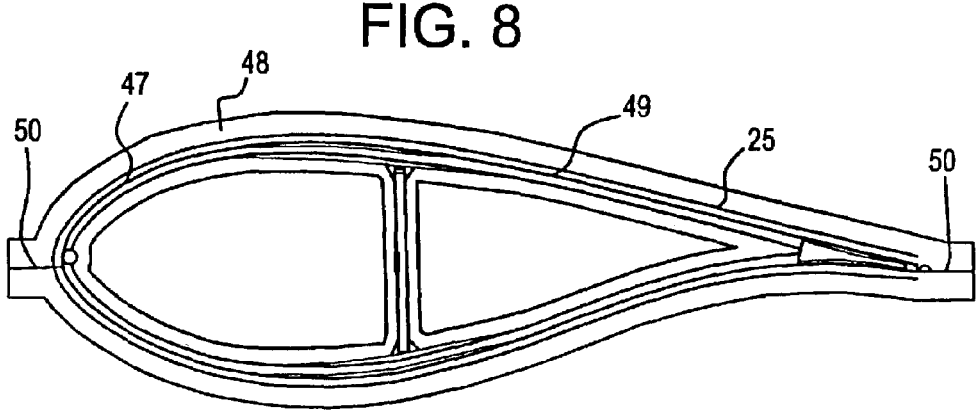

FIG. 8 shows the next step in making windmill blades by the method according to the invention. Across the outer layer of fiber material 47 there is disposed one or more mold parts 48 that are shaped as a negative impression of a part of the outer surface of the blade, here illustrated the part termed the suction side, and which during operation of the windmill largely faces away from the wind. The mold part 48 may be treated on the surface 49 on which the blade is molded with a suited release agent. The mold part is provided with closure edges 50 with which tightness may be achieved against the first mold part 22. The mold part may be provided with an integrated temperature regulation system 25 with which the temperature of the laminate of the blade may be changed during setting. The mold part 48 may be composed of several parts with joints that are to attain tightness.

Figure 9:
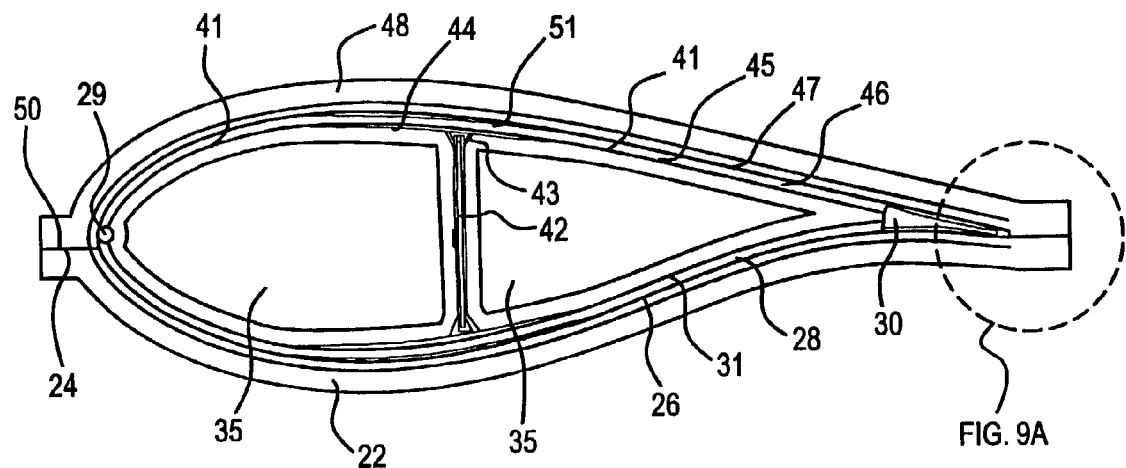
Figure 9A:
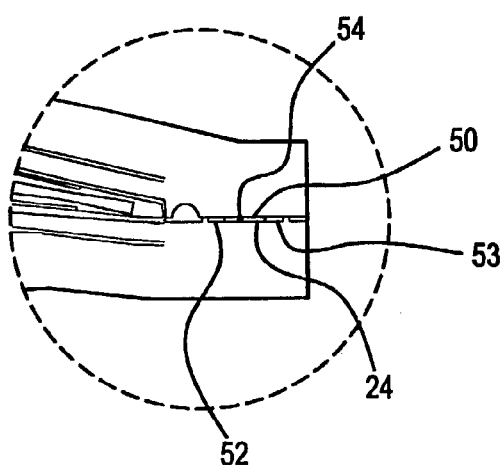

FIG. 9 shows the next step in making windmill blades by the method according to the invention. Between on the one hand the mold parts 22 and 48 and on the other hand the flexible membrane 41 around the mold core 35 there is a cavity 51. The cavity 51 is partly filled by the fiber materials 26, 31, 44, 45 and 47, the core materials 28, 42, 43, and 46, the flow pipe 29 and possible other core parts 30, as the cavities between the fibers and between the fibers and other parts are filled with air. Now, vacuum is applied to the cavity 51 so that at least a substantial part of the air staying between the parts in the cavity is evacuated. Thereby, fiber and core materials etc. are compressed in the cavity 51 as the flexible membrane 41 expands. In order to ensure good sealing, the surfaces between the closure edges 24 and 50 may advantageously be made with at least two sealing arrangements, an internal arrangement 52 and an external arrangement 53, so that between these arrangements there is provided a cavity 54 that may be subjected to vacuum separately from vacuum in the cavity 51, and which may advantageously be maintained at a lower absolute pressure than the cavity 51, whereby possible leakages from the surrounding air to the cavity 51 is prevented.

Figure 10:
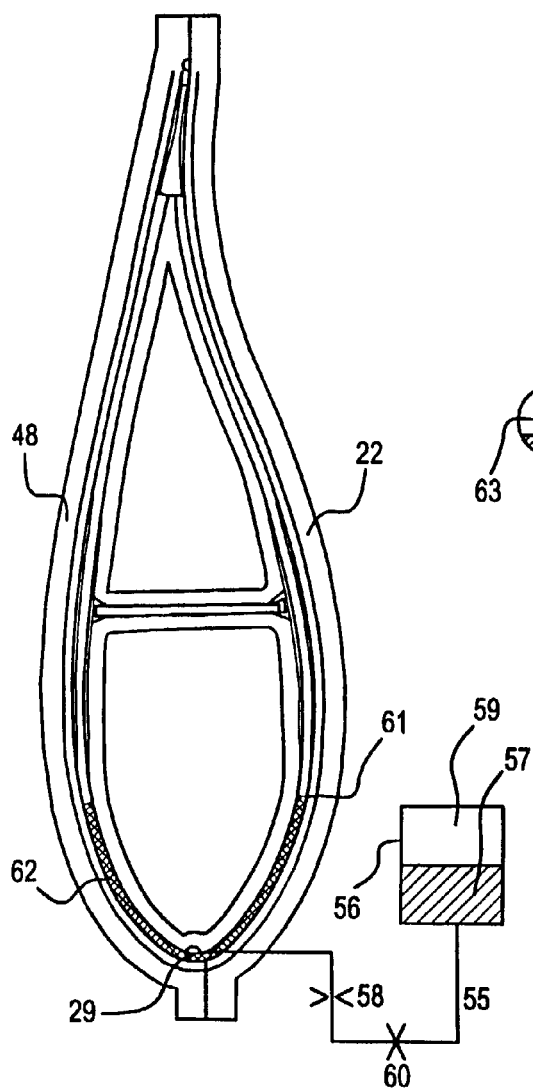

FIG. 10 shows the next step in making windmill blades by the method according to the invention. The closed mold, consisting of the mold parts 22 and 48 with the entire amount of fiber and core materials, mold cores etc., is now turned about its longitudinal axis, so that the flow pipe 29 assumes a position close to the lowest point in a cross-section of the closed mold. A connection 55 is established between the flow pipe 29 and a reservoir 56 with suitable resin 57 with the right mix ratio, e.g. polyester, vinyl ester or epoxy. The connection 55 that may be a pipe or a tube or combinations thereof, may be provided with a variable flow control valve 58, or in other ways there may be established means for controlling the flow rate in connection 55 to the flow pipe 29, e.g. in the form of pressure control of the space 59 over the resin 57. The connection 55 may be provided with a stop cock 60, or in other ways there may be established possibility of blocking the flow from the reservoir 56 through the connection 55, e.g. by the flow control valve 58 being able to shut the connection off completely. When the blade has the desired position, there is opened up for the flow in the connection 55, and injection is commenced as the resin flows into the cavity 51 under action of the pressure difference between the vacuum established in the cavity and the pressure on the resin 57. During the injection, the flow is regulated with the flow control valve 58, or in other ways, so that a controlled development of the fluid front 61 of the injected resin 62 is maintained with balance between regulated inflow and gravitation. The fluid front may e.g. be tried kept approximately horizontal so that the risk of blocking and confinement of larger or lesser amounts of residual air is minimized.

Figure 11:
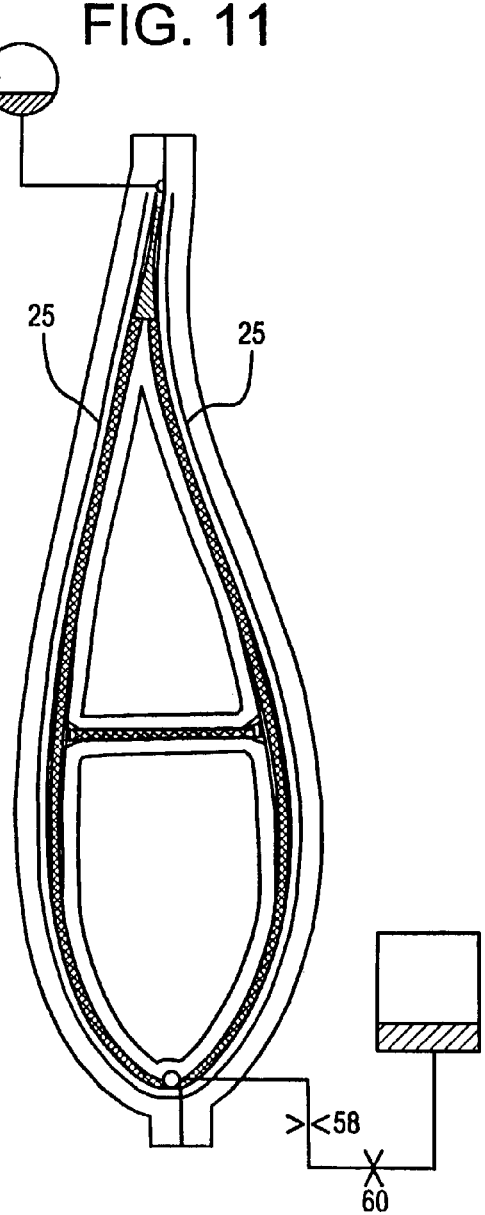

FIG. 11 shows the next step in making windmill blades according to the invention. The flow front 61 has now reached the trailing edge of the blade, and resin now penetrates up into one or more overflow containers 63. When there is pure resin in the relevant overflow containers, the injection is terminated by the stop cock 60, or in other ways. The temperature regulating system 25 may be active during the whole or a part of the injection process, and particularly after finished injection it may be used to bring the injected laminated up to a temperature that enhances the setting process for the resin. Depending on the embodiment, the temperature regulating system may also be used for cooling mold and laminate, if the exothermic heat of the setting process is in danger of raising the temperature of mold and laminate to an undesired level. However, one may also completely omit a temperature regulating system in the mold and perform possible final setting in a separate process afterwards.

After finished setting, the molds are opened and the finished blade is taken out.

Before or after the blade is taken out, the mold core 35 is removed. In the shown example there is used a mold core in two core parts 37 and 38. The front core part 37 may be removed in one piece in this example, whereas the rear core part 38 may advantageously be divided into subparts that are removed in the sequence which is most convenient with regard to geometry and handling. If a core part 37 consists of a firm internal part 39 surrounded by a flexible external part 40, which e.g. may be made of foam rubber and enclosed by a flexible, airtight membrane, over at least apart of its outer side, it may advantageous to apply vacuum on the flexible external part 40, whereby the airtight membrane 41 contracts and is released in relation to the cavity in the molded blade. For this process, it may be an advantage that the flexible, airtight membrane 41 is constituted by plural layers so that possible adherence between the molded blade and the airtight membrane is limited to the outermost layer of the membrane. It may also be an advantage to provide an airtight layer between the firm internal part 39 and the flexible external part 40 so that vacuum is limited to the flexible external part 40, and larger or lesser pressure loads are not applied on the firm internal part 39.

In the above, the process is described with the use of a flow pipe 29 which is integrated in the leading edge of the blade. The flow pipe may very well be disposed outside the blade itself, e.g. in a recess in the mold, and this recess may constitute the flow duct so that a separate pipe is not necessary. Versions with more flow pipes and flow ducts integrated in the blade as well as disposed externally as continuous recesses or tubes in the mold parts may also be envisaged, or partly or entirely in the shape of flow pipes with discrete inlets at the inner sides of the mold parts.

In the above is described a practical embodiment of the method, where the fiber material is laid in dry conditions, and where the resin is supplied by vacuum injection. In other practical embodiments, a so-called prepeg is laid, where the fiber materials are impregnated with resin in advance, which, after being applied vacuum, is brought to set by the action of heat, UV irradiation, or similar, or fiber materials that are combinations of temperature resisting fiber materials and thermoplastic may be laid, and where the fiber material after laying may be brought to a temperature where the thermoplastic material melts and thereby acts as resin in the finished laminate.

Combinations of the practical embodiment of the method with fiber material laid in dry condition and where a part of laid material is in form of finished fiber reinforced parts, e.g. previously molded part for the blade root or longitudinally pultruded profiles.

Combinations of materials in the laying may also be envisaged, which otherwise in prior art methods are held separate to each other. E.g. mats in prepeg may also be envisaged where the integrated resin contributes to the injection of the surrounding dry fiber material to a certain degree, and where the amount of resin needed for complete impregnation of the laminate is provided by vacuum injection as described above.

The invention claimed is:

1. A method for making a windmill blade of composite materials that include a fiber reinforced matrix material, the improvement comprising that the blade is made in one piece in a closed mold and comprising steps that provide:

a removable mold core with a flexible external core part wrapped around an internal, firm or workable core part and surrounded by a flexible, air-tight membrane, and outer mold parts arranged to close around the mold core for formation of a mold cavity there between, that composite material is laid on an outer mold part and/or the mold core, that at least one flow pipe is placed in the mold cavity at the side edge for injecting matrix material, that the outer mold parts are closed around the mold core and around the composite material placed in the mold cavity, that the composite material is set, that the outer mold parts are removed, and that the mold core is taken out of the shape permanent blade before or after removing the outer mold parts, wherein some of the required matrix material is used in connection with the reinforcing fibers when laying the composite material and where additional matrix material is injected via the flow pipe after closing the mold, wherein the composite material is laid around a sandwich core material for forming the blade as a sandwich structure by providing a first inner layer of fiber material on an inner side of the sandwich core material and by providing a second, outer layer of fiber material on an outer side of the sandwich core material, wherein the first layer covers at least part of a surface of the second layer or wherein the second layer covers at least part of the surface of the first layer, where the sandwich core material is used for evacuation and flow at vacuum formation of the blade as the mold cavity is subjected to vacuum whereby air is evacuated simultaneously with composite materials being pressed against the inner side of the outer mold parts due to expansion of the flexible membrane of the mold core, and where the matrix material is injected following formation of the mold cavity by vacuum.

2. A method according to claim 1, wherein the mold cavity is rotated 90 degrees, material is injected through the flow pipe now disposed at a vertical underside of the mold cavity and with a flow regulated for controlling an upwardly advancing fluid front of the matrix material so as to avoid confinement of air in the mold cavity.

3. A method according to claim 1, wherein the first, inner and second, outer layers of fiber material each have upper and lower portions, the lower portion of the outer layer of fiber material extending beyond a side edge of the mold cavity is laid on a first outer mold part, where a layer of core material and possible other core parts are placed, where the lower portion of the inner layer of fiber material extending beyond the said side edge is laid, where the mold core is placed in the layers that are laid, where the fiber material extending beyond the side edge is folded in over the mold core and the flow pipe, where the upper portion of the inner layer of fiber material, a layer of core material and the upper portion of the outer layer of fiber material are laid on the mold core, where a second outer mold part is placed in close contact with the first outer mold part, where vacuum is applied to the mold cavity and where the matrix material is injected via the flow pipe and flows to the core material and to the inner and outer layers of fiber.

4. A method according to claim 1, wherein core inserts are disposed between the layers of fiber material and are taken out of the mold together with the composite material for making a blade in which such inserts constitute structural elements in the finished blade.

5. A method according to claim 1, wherein thermal setting is used, and wherein the temperature in the composite materials of the blade are changed during the setting by using a temperature control system in at least one of the mold parts.

6. A method according to claim 1, wherein the sandwich core material is provided with through-going passages used as ducts for fluid matrix material between the two layers of fiber material.

7. A method according to claim 1, wherein injection of the matrix material is terminated when fluid matrix material is pressed out of apertures at the upwardly facing side edge of the blade.

8. A method according to claim 1, wherein the mold core is provided as a plurality of separate sections.

9. A method according to claim 3, wherein parts of the lower portions of the inner and outer layers of fiber material are put together into the upper portion of the inner or outer layer of fiber material so that overlap of fiber material occurs at the side edge.

10. A method according to claim 3, wherein at least two sealing arrangements are provided opposite the flow pipe where the second outer mold part meets the first outer mold part, so that a cavity is created between the two arrangements that may be subjected to a vacuum different from that in the mold cavity, maintaining a lower absolute pressure than in the mold cavity and preventing leakages from the surrounding air to the mold cavity.

11. A method according to claim 5, wherein the temperature control system is active during the whole or a part of the injection process.

12. A method according to claim 5, wherein the temperature control system is used to cool the mold when the exothermic heat of the setting process is in danger of raising the temperature of the mold to an undesired level.

13. A method according to claim 1, wherein the flexible membrane further comprises multiple layers.

14. A method according to claim 1, further comprising providing an airtight layer between the firm internal core part and flexible external core part.

15. A method according to claim 1, further comprising providing a flow pipe as a recess in the mold outside the blade itself.

16. A method according to claim 1, further comprising providing flow pipes and ducts integrated in the blade as well as disposed externally as recesses or tubes in the mold parts.

17. The method of claim 8, further comprising providing a shear web between separate sections of the mold core made with an inner core part and which at each side has a core support part in one or more parts and placing a shear web fiber material on each or both sides of the inner core part and core support parts.

18. The method of claim 3, wherein the mold core is provided as a plurality of separate sections, further comprising providing a shear web between separate sections of the mold core made with an inner core part and which at each side has a core support part in one or more parts and placing a shear web fiber material on each or both sides of the inner core part and core support parts, wherein the shear web fiber material extends to some extent across the inner layer of fiber material and across the mold core.

* * * * *